United States Patent [19]

Stamm et al.

[11] Patent Number: 4,978,582
[45] Date of Patent: Dec. 18, 1990

[54] RESISTANCE-WELDABLE COMPOSITE

[75] Inventors: Klaus Stamm; Ulrich Tenhaven, both of Dortmund, Fed. Rep. of Germany

[73] Assignee: Hoesch Stahl AG, Dortmund, Fed. Rep. of Germany

[21] Appl. No.: 419,770

[22] Filed: Oct. 11, 1989

[30] Foreign Application Priority Data

Oct. 13, 1988 [DE] Fed. Rep. of Germany ....... 3834829

[51] Int. Cl.$^5$ ................................................ B22F 3/00
[52] U.S. Cl. .................................... 428/551; 428/556; 428/558; 428/624; 428/626
[58] Field of Search ............... 428/551, 556, 558, 624, 428/625, 626

[56] References Cited

U.S. PATENT DOCUMENTS

| | | | |
|---|---|---|---|
| 4,482,600 | 11/1984 | Matsumoto et al. | 428/213 |
| 4,678,707 | 7/1987 | Shinozaki et al. | 428/323 |
| 4,749,623 | 6/1988 | Endo et al. | 428/551 |
| 4,794,050 | 12/1988 | Campbell et al. | 428/551 |
| 4,873,149 | 10/1989 | Shinoda et al. | 428/609 |

Primary Examiner—Stephen J. Lechert, Jr.
Assistant Examiner—Leon Nigohosian, Jr.
Attorney, Agent, or Firm—Max Fogiel

[57] ABSTRACT

The invention concerns three-layer composites with their plastic core so uniformly enriched with an appropriate percentage by volume of a ferrosilicon with an appropriate particle size that the composites can be securely joined to each other and to sheets of metal alone by resistance welding. The property applies to composites with either a viscously elastic or an impact-resistant core.

3 Claims, 1 Drawing Sheet

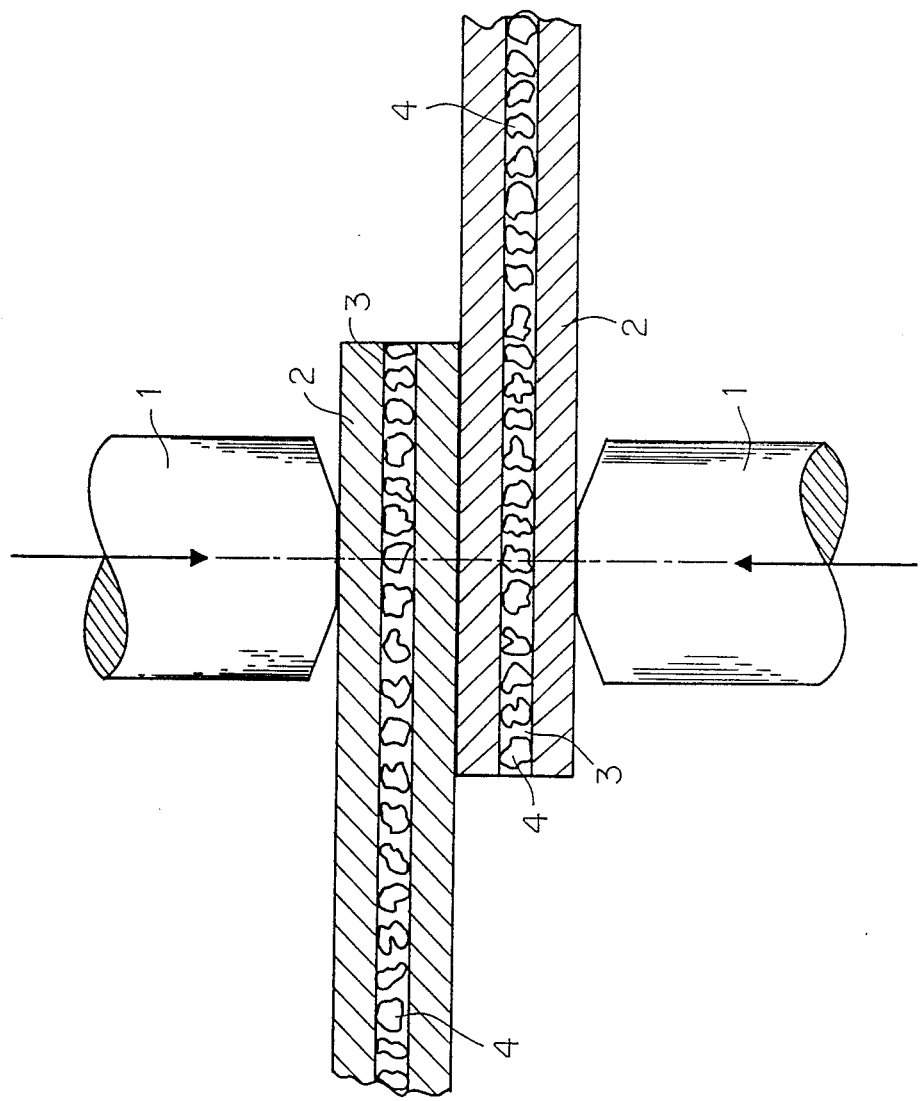

RESISTANCE-WELDABLE COMPOSITE

The invention concerns a composite of generally two outer steel layers and an intermediate plastic layer. The intermediate layer, or core, preferably consists of viscously elastic or impact-resistant plastic.

Composites with a thin (e.g. 50–200 μm) and viscously elastic intermediate plastic layers attenuate vibrational and structural noise and are employed wherever noise is combated, especially to diminish the propagation of structural noise and the transmission of airborne noise. The automobile, household-appliance, and machinery industries are examples of fields of application.

Composites with a relatively thicker (e.g. 200–1000 μm) and impact-resistant intermediate plastic layer weigh less per area than a sheet of steel of equal rigidity, are more rigid than a sheet of steel of equal weight, and can be successfully employed wherever where light weight and high rigidity are important. These composites are employed in the aircraft and automotive-body industries.

The practicality of these composites extensively depends on how well they can be cut, shaped, and joined. Most of these processes entail no problems in principle, and it is only necessary to modify the tool and machinery parameters employed with sheet metal of the same rigidity. The electric-resistance welding situation on the other hand is basically different. This technique is one of the most common and economical joining procedures in industrial-scale manufacture. In contrast to a strictly metal sheet, it is possible to initiate an electric current through an electrically insulating viscously elastic intermediate plastic layer in a composite of this type only by inconvenient special means and it is impossible when the intermediate layer is impact-resistant. Resistance spot and seam welding are accordingly very expensive or even impossible.

One special means of dealing with viscously elastic intermediate layers is to generate an electric shunt in the form for example of a metal terminal, a projection, or the just previous welding spot before each weld. The current flowing through the affluent locally heats the outer layer of metal and hence the intermediate plastic layer. The plastic softens until the electrode pressure is powerful enough to force the intermediate layer aside, bring the two outer layers into direct contact with one another, and accordingly initiate spot welding. This successive "point-by-point" approach, however, is hardly practical in the manufacture of automotive bodies for example, where up to 20 welding spots must be applied at once in synchronized welding lanes.

There has accordingly been no lack of attempts to find appropriate means of electric-resistance welding composites as easily as sheet metal alone. One obvious approach for example is to provide the intermediate plastic layer with an appropriate proportion of electrically conductive pigments of an appropriate material with an appropriate particle shape and size before the composite is assembled. It is for instance known that some manufacturers of composites mix powdered nickel or graphite and obtain products that can actually be spot welded. This technique, however, has many drawbacks and cannot be employed in all areas.

The method is limited for example to very thin intermediate layers.

Powdered nickel is uncommonly expensive and, at a specific gravity of 8.9 kg/dm$^3$, relatively heavy, which is a particular drawback for light-construction composites. Another drawback is the nickel vapor that always occurs during welding and is not permitted by the regulations in force.

Since powdered graphite has a high electric transition resistance, a lot (15–25% by vol.) must be added, to the considerable detriment of such properties of the intermediate plastic layer as adhesion to the outside metal sheet, attenuation factor, impact resistance, and ease of manufacture, as well as of the quality of the weld. It is also impossible to reproduce the welds identically. The rejection rate is higher than 10%.

Akihiko Nishimoto et al in "Weldable Vibration Damping Steel Sheet," NKK Technical Review 53 (1988), pages 10 to 18, thoroughly discusses the problem of resistance welding in conjunction with the processing of laminated composites.

Weldable sealing compounds for joining metal components together are known from German OS No. 3 426 770.

The object of the invention is to employ appropriate technical means to develop composites to the extent that both structural-noise attenuating composite sheets and light-construction composite sheets can be electric-resistance welded like strictly metal sheets.

This object is attained in that the intermediate plastic layer is enriched with uniformly distributed specific percentages by volume of particles of a specific size of such electrically conductive pigments as ferrosilicon to make the composite resistance-weldable.

Extensive testing has demonstrated that methods—using electrically conductive plastics, electrodes with projections, or outer layers that are fluted or "bumpy" for example—other than adding electrically conductive pigments to the intermediate plastic layer do not attain the desired object.

The few electrically conductive plastics do not have enough of a loss factor, do not adhere to the outer layers without being cemented to it, are very expensive, and have a high electric transition resistance. They can accordingly not be used for weldable composites.

Electrodes with tungsten projections did not allow spot welding even though the projections were deep enough because the projections melted off even during the preliminary weak-current heating phase. Although spot welding did occur between laminated composites with one smooth and one "bumpy" surface due to the contact between the "bumps" and the smooth surface facing them, the spots were often not in the desired location, where the electrodes were applied, but sometimes also at adjacent "bumps," where the resistance was incidentally lower as the result of unavoidable dimensional tolerances and where the welding procedure accordingly initially occurred.

These negative results led to tests of composite sheets with different pigments in their intermediate plastic layers. Some of these results were also negative. Some powdered metals—aluminum, iron, and magnesium for example—did not allow welding at all. Others—high-quality steel and nickel for example—although they did satisfy the objective of shuntless welding, had other, already mentions, drawbacks.

FIG. 1 illustrates one possible example of resistance-welding composites. The sheets that are to be welded together are compressed between electrodes 1. The two sheets are made out of the same composite, consisting of two outer layers 2 of sheet steel and of an intermediate plastic layer 3. The intermediate layer is enriched with an appropriate percentage by volume of an iron alloy, preferably ferrosilicon.

The irregular shape imposed on the particles of ferrosilicon by the grinding process and differing so obviously from the spherical shape of powdered nickel does not have a detrimental effect on electric-resistance weldability. That the particles of alloy can be as much as 30% thicker than the layer of plastic itself makes no difference in that any projections or angles on a particular particle will be broken off or forced into the outer layer by the pressure of the electrodes, maintaining the rated thickness of the intermediate layer.

An appropriate percentage by volume of ground-ferrosilicon powder with an appropriate particle fracture will accordingly supply all the properties necessary to ensure 100% spot welding without the drawbacks typical of other pigments and described herein. The reproducible spot quality is not inferior to that obtained with regular sheet steel. At a specific gravity of 2.8 kg/dm$^3$, ferrosilicon is very light, does not produce any unhealthful vapors when welded, and can be further processed with no negative effects on the quality of the welding spots.

Composite sheets of the aforesaid type can accordingly be spot-welded together and to sheets of metal without any problems.

We claim:

1. A resistance-weldable three-layer composite for attenuating vibrations comprising: two outer steel layers; a viscously elastic plastic core between said two outer layers' said plastic core having a thickness and being impact-resistant; said three-layer composite having a substantially low weight per unit area; said plastic core containing a uniformly distributed powdered ferrosilicon in an amount of at least 3% by volume, said ferrosilicon having a particle size ranging from 70% to 130 % of the thickness of said core; said ferrosilicon comprising further broken nonspherical material with particles of irregular shape.

2. A resistance-weldable three-layer composite as defined in claim 1, wherein said plastic core contains 5% to 10% by volume of powdered ferrosilicon.

3. A resistance-weldable three-layer composite as defined in claim 1, wherein said powdered ferrosilicon in said plastic core has particles that are 90% to 120% as thick as the thickness of said plastic core.

* * * * *